Patented Oct. 3, 1939

2,175,122

UNITED STATES PATENT OFFICE 2,175,122

VAT DYESTUFFS

Walter Kern, Sissach, Switzerland, assignor to the firm of Society of Chemical Industry in Basle, Basel, Switzerland No Drawing. Application January 9, 1937, Serial No. 119,891. In Switzerland February 6, 1936

3 Claims. (Cl. 260—365)

This invention relates to the manufacture of vat-dyestuffs by the action of an ortho-dicarboxylic acid-anhydride on fluoranthene in presence of a condensing agent, wherein for 1 mol of fluoranthene at least 2½ mols of the ortho-dicarboxylic acid-anhydride are used.

As ortho-dicarboxylic acid-anhydrides may be used, for example, phthalic-anhydride, naphthalene-2:3-dicarboxylic acid-anhydride, anthraquinone-dicarboxylic acid-anhydride and substitution products of these anhydrides, for instance halogen- or alkyl-ortho-dicarboxylic acid-anhydrides.

Suitable condensing agents are, for instance, aluminium halides, such as aluminium chloride, or ferric chloride; these condensing agents may be used in presence of an additional substance which lowers the melting point, for instance an alkali halide (sodium chloride or potassium chloride, or both) or of a solvent or a dispersing agent for example benzene, trichlorobenzene, chloronaphthalene or nitrobenzene.

The process may consist in condensing 1 mol fluoranthene with at least 2½ mols ortho-dicarboxylic acid-anhydride to the vat-dyestuff in a single stage, preferably at 120–160° C., or in producing in one stage from 1 mol fluoranthene and 1 mol ortho-dicarboxylic acid-anhydride a mono-ketone-carboxylic acid or a corresponding di-ketone, which then in a second stage may be converted into the vat-dyestuff by condensation with at least 1½ mols ortho-dicarboxylic acid-anhydride, preferably at 120–160° C.

A further feature of the invention consists in the treatment of the products obtained in the manner described above with a substituting agent or a condensing agent or both, for instance sulfuric acid, an aldehyde, for example formaldehyde, or a halogenating agent, for example chlorine or bromine, whereby further valuable products are obtained.

The new products may be purified by one or more crystallizations from a solvent of high boiling point, preferably trichlorobenzene, or by conversion into their salts from strong acids, or by treatment with an oxidizing agent, for instance a solution of alkali hypochlorite; they may be converted by known methods into leuco-derivatives, for example the leuco-sulfuric acid esters.

The products of this invention are in part valuable intermediate products and in part dyestuffs; the latter can be used, for example, in dyeing and printing vegetable fibers, for instance cotton. The dyeings and printings produced are very fast.

The following examples illustrate the invention, the parts being by weight, unless otherwise stated, and the parts by weight and parts by volume being related as is the kilo to the liter:—

Example 1

20.2 parts of fluoranthene, 90 parts of phthalic anhydride and 180 parts of aluminium chloride are intimately mixed together and the mixture is baked for 6 hours at a temperature of 85–90° C. For completing the reaction the temperature is raised in stages, namely 6 hours at 110–120° C. and 8 hours at 128–130° C. After cooling, the mass is comminuted and introduced for separating the aluminium chloride into dilute hydrochloric acid which is boiled; the mass is then filtered and the residue extracted first with water and then with dilute sodium carbonate solution. After recrystallization from trichlorobenzene the dyestuff of the formula

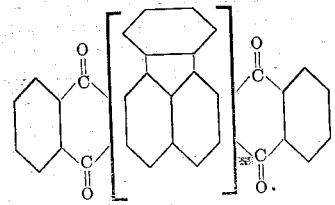

is obtained in the form of a brown crystalline powder, soluble in concentrated sulfuric acid to a cherry red solution and dyeing cotton in a blue vat yellow, very fast tints.

Vat dyestuffs having very similar properties are also obtained when exchanging the phthalic anhydride used in this example for the equivalent quantity of bromo- or chloro-phthalic anhydride.

Example 2

315 parts of aluminium chloride, 66 parts of potassium chloride and 45 parts of common salt are together melted at 112–117° C., and then there is introduced into the melt, in portions and in the course of half-an-hour, a mixture of 20.2 parts of fluoranthene and 60 parts of phthalic anhydride. For completing the reaction the mass is stirred for 6½ hours at 130–135° C. The cooled mass is comminuted, introduced into dilute hydrochloric acid, which is then boiled. After filtering, the solid matter is extracted with boiling water. For purification this crude dyestuff is extracted with dilute sodium carbonate solution and then with alcohol. The dyestuff is a dark brown powder, which may be purified by recrystallization from trichlorobenzene. It dissolves in concentrated sulfuric acid to a cherry red solution and dyes cotton in a blue vat yellow tints of very good fastness.

Example 3

3 parts of mono-phthaloyl-fluoranthene of melting point 332° C., which dissolves in concentrated sulfuric acid to a blue solution, 4.5 parts of phthalic anhydride and 9 parts of aluminium chloride are intimately mixed together and the mixture is heated for 24 hours at 140–145° C. The cooled mass is comminuted and introduced into dilute hydrochloric acid for separating the aluminium chloride. After boiling this mixture it is filtered and the solid matter washed and extracted, first with dilute sodium carbonate solution and then with alcohol. For purification it is recrystallized from trichlorobenzene, a brown crystalline powder being obtained. This dissolves in concentrated sulfuric acid to a dirty cherry red solution and dyes cotton in a blue vat yellow-brown tints. The dyestuff is similar in its dyeing properties to that obtained as described in Examples 1 and 2.

Example 4

2.3 parts of the dyestuff obtained as described in Example 1 are suspended in 60 parts of nitrobenzene, some iodine is added and, at 20° C., in the course of half-an-hour, 3 parts of sulfuryl chloride are added by drops. In order to hasten the reaction the temperature is raised to 62–66° C. and kept there for 16 hours. After cooling and filtering, the solid matter is washed with benzene and alcohol and dried. This chlorinated dyestuff is a yellow powder, soluble in concentrated sulfuric acid to a cherry red solution and dyeing cotton in a blue vat very fast yellow tints.

Example 5

2.3 parts of the dyestuff made as described in Example 1 are suspended in 60 parts of nitrobenzene, a little iodine is added and in the course of half-an-hour, at 20° C., 3.4 parts of bromine are added by drops. The temperature is now raised to 80–85° C. and kept there for 16 hours while stirring. After cooling, the whole is filtered and the solid matter washed with benzene and alcohol and dried. This brominated dyestuff is a brown-orange powder, soluble in concentrated sulfuric acid to a cherry red solution and dyeing cotton in a blue vat yellow-brown tints of very good fastness.

What I claim is:

1. Vat dyestuffs of the general formula

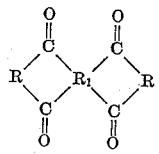

wherein the two R's represent aryl radicals selected from the group consisting of the benzene and naphthalene series and $R_1$ represents a fluoranthene radical in which two adjacent carbon atoms together form a six-membered carbon ring with each

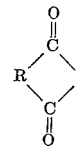

grouping.

2. Vat dyestuffs of the general formula

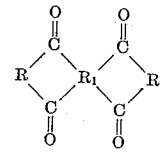

wherein the two R's represent phenyl radicals and $R_1$ represents a fluoranthene radical in which two adjacent carbon atoms together form a six-membered carbon ring with each

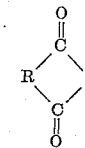

grouping.

3. Vat dyestuffs of the general formula

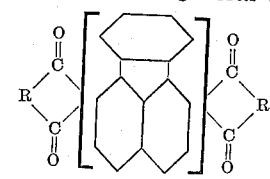

wherein the two R's represent phenyl radicals and two adjacent carbon atoms together of the fluoranthene radical form a six-membered carbon ring with each

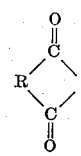

grouping.

WALTER KERN.